Jan. 13, 1948.  E. LAKATOS  2,434,274
ARTILLERY COMPUTER
Filed April 11, 1944  4 Sheets-Sheet 1

INVENTOR
E. LAKATOS
BY
W.R. Dawson
ATTORNEY

Jan. 13, 1948.                 E. LAKATOS                 2,434,274
                           ARTILLERY COMPUTER
                         Filed April 11, 1944                 4 Sheets-Sheet 2

INVENTOR
E. LAKATOS
BY
ATTORNEY

Jan. 13, 1948.  E. LAKATOS  2,434,274
ARTILLERY COMPUTER
Filed April 11, 1944    4 Sheets-Sheet 3

INVENTOR
E. LAKATOS
BY
*W. R. Dawson*
ATTORNEY

Jan. 13, 1948.                E. LAKATOS                2,434,274
                          ARTILLERY COMPUTER
                       Filed April 11, 1944         4 Sheets-Sheet 4

INVENTOR
E. LAKATOS
BY
ATTORNEY

Patented Jan. 13, 1948

2,434,274

UNITED STATES PATENT OFFICE 2,434,274

ARTILLERY COMPUTER

Emory Lakatos, Summit, N. J., assignor to Bell Telephone Laboratories, Incorporated, New York, N. Y., a corporation of New York Application April 11, 1944, Serial No. 530,529

15 Claims. (Cl. 235—61.5)

1

This invention relates to artillery computers, and particularly to electromechanical computers.

The object of the invention is a method and means for computing the azimuth and elevation angles of a pivot gun, when the target is not in the same horizontal plane as the gun; and the azimuth and elevation angles of a second gun to the same target.

A feature of the invention is the combination of an azimuth potentiometer, a pair of wind potentiometers and two sets of gun parallax potentiometers from which voltages are derived proportional to the ballistic range and deflection effects of the wind; the lateral displacement of the pivot gun with respect to the line of fire of the second gun; and the difference in the ranges of the two guns.

Another feature of the invention is a means of compensating for the height of site by a ballistic range correction.

Another feature of the invention is a means for computing a ballistic elevation angle and, using the principle of the rigidity of the trajectory, computing therefrom the elevation angles of the guns.

A further feature of the invention is a means for computing a ballistic elevation angle corrected for the complementary angle of site, and, using the principle of the rigidity of the trajectory, computing therefrom the elevation angles of the guns.

From some convenient observation station, the distance to the target is continuously measured by known means, such as by triangulation, horizontal base range finder, depression position finder, radio or sonic location, or other means. The readings are transmitted to the computer by some convenient data transmission system, such, for example, as the system shown in United States Patent 1,483,235, February 12, 1924, R. V. Morse. The complete distance may be sent by the data transmission system, or, for greater accuracy, the thousands and hundreds of yards may be telephoned at regular intervals to the operator of the computer, and the smaller values continuously sent by the data transmission system.

The winding of the transmitting potentiometer is connected to the winding 1 of the receiving potentiometer, and the brush of the transmitting potentiometer is connected through a meter 2 to the brush 3 of the receiving potentiometer. The brush 3 is rotated by shaft 4, but is insulated therefrom.

A constant speed motor 5 drives the shaft 6 through a variable speed transmission, which may be of the type shown in United States Patent 1,448,490, March 13, 1923, H. Moakley, in which a disc, driven by the motor 5, drives a cylinder on the shaft 6 by means of an interposed ball. The position of the ball race is adjusted by a rack and pinion 7 adjusted through gears 8 by a handwheel 9.

The shaft 6 drives the shaft 4 through a differential gear 10. The handwheel 9 is geared to the ring gear of differential 10 to add an angular change to the shaft 4.

The handwheel 9 may be manipulated to adjust the angular position and rate of the shaft 4 to smoothly track the transmitting instrument, thus maintaining the meter 2 at zero.

Figures 1, 2:
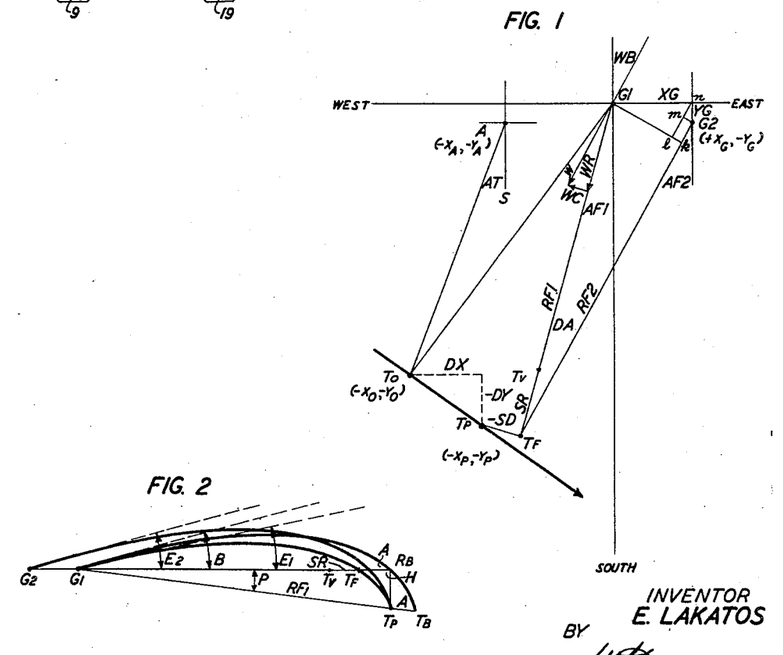
Fig. 1 diagrammatically shows the geometrical relationships in a horizontal plane.
Fig. 2 diagrammatically shows the geometrical relationships in a vertical plane.

The azimuth of the target with respect to some selected axis is measured by known optical or radio means, such as a theodolite. As shown in Fig. 1, the azimuth $A_T$, from the point of observation A to the present position of the target $T_0$, may conveniently be measured clockwise from the south.

The azimuth is continuously transmitted to the computer by some convenient data transmission system, such as the system used for transmitting the range data. The whole angle may be transmitted, or, for greater accuracy, the whole degrees may be sent to the operator by telephone, and only the smaller values transmitted by the data transmission system.

The winding of the transmitting potentiometer is connected to the winding 11 of the receiving potentiometer. The brush of the transmitting potentometer is connected through the meter 12 to the brush 13 of the receiving potentiometer. The brush 13 is moved by the shaft 14 but is insulated therefrom.

The motor 15 drives the shaft 16 through a variable speed transmission and the shaft 16 drives the shaft 14 through differential gear 20. The handwheel 19, through differential gear 20, can add an angular change to the shaft 14, and, through gears 18 can adjust the rack and pinion 17 to change the rate of shaft 14 to maintain meter 12 at zero.

The shaft 4 thus rotates proportionally to the range and the shaft 14 proportionally to the azimuth. The rotations of shafts 4 and 14 may be indicated by dials 21, 22.

A source of voltage 23, having the negative pole grounded, is connected across the potentiometer winding 24. The brush 25 is rotated by shaft 4 to select a voltage positive with respect to ground, proportional to the distance to the target.

Figure 6:
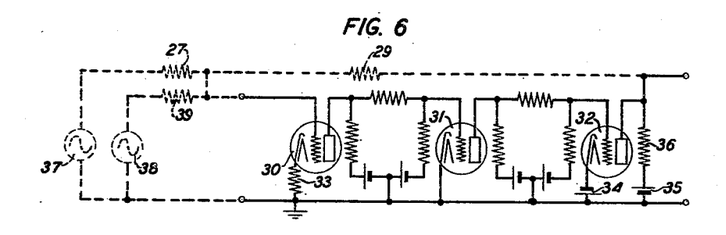
Fig. 6 schematically shows an amplifier used in Figs. 3, 4, 5A, 5B, 5C.

The brush 25 is connected to a tap in the potentiometer winding 26 and through a resistor 27 to the input circuit of a unity gain amplifier 28, of the type shown in Fig. 6, having a feedback resistor 29. The amplifier 28 reverses the polarity of the applied voltage.

The amplifier shown in Fig. 6 includes three vacuum tubes 30, 31, 32, coupled by suitable interstage networks, which may be of the type shown in U. S. Patent 1,751,527, March 25, 1930, H. Nyquist. Though for convenience, the vacuum tubes 30, 31, 32 have been shown as triodes, other types of tubes, such as pentodes or beam tubes, may be used with appropriate changes in the power supplies. The cathodes are heated by the usual heater circuit (not shown). The control grid of vacuum tube 30 may be biased by the usual cathode biasing resistor 33.

If a voltage be applied to the control grid of vacuum tube 30, an amplified voltage of the same polarity will be applied to the control grid of vacuum tube 32.

A source of voltage 34, having the positive pole grounded, is connected to the cathode of vacuum tube 32. A source of voltage 35, having the negative pole grounded, is connected through resistor 36 to the anode of vacuum tube 32. The resistances of the anode-cathode path of vacuum tube 32 and resistor 36, and the voltages of the sources 34, 35 are adjusted so that, in the absence of a signal voltage applied to the control grid of vacuum tube 32, they form a balanced bridge and no voltage is applied to the output circuit.

When an amplified positive voltage is applied to the control grid of vacuum tube 32, the anode-cathode resistance of vacuum tube 32 is decreased, unbalancing the bridge and applying a negative voltage to the output circuit. The polarity of a voltage applied to the input circuit of the amplifier is thus reversed in the output circuit.

A feedback resistor, such as resistor 29, may be connected from the anode of vacuum tube 32 to the control grid of vacuum tube 30.

Assume that a source 37 of a voltage, positive with respect to ground, be connected through resistor 27 to the control grid of vacuum tube 30. A current will tend to flow through resistor 27 to the control grid of vacuum tube 30. As this control grid is biased negatively, no current will flow through vacuum tube 30 from the control grid to ground. The current will tend to flow through resistor 29, anode-cathode path of vacuum tube 32 and ground back to the source. The amplified positive voltage on the control grid of vacuum tube 32 decreases the anode-cathode resistance of this vacuum tube to permit the current to flow. This decrease unbalances the bridge and applies a negative voltage to the output circuit of the amplifier. The current will increase to a magnitude such that all the voltage of source 37 is used in forcing the current through resistor 27 and the voltage applied to the control grid of vacuum tube 30 is reduced substantially to zero. As the same current flows in resistors 29 and 27, the voltage drop in resistor 29 is to the output voltage as the voltage drop in resistor 27 is to the voltage of source 37, that is, the output voltage equals the voltage of source 37 multiplied by the ratio of the resistances of resistors 29 and 27.

If a second source of voltage 38 be connected through a resistor 39 to the control grid of vacuum tube 30, a current from this source 38 will flow through resistors 39 and 29, the anode-cathode path of vacuum tube 32 and ground back to source 38. If the resistances of resistors 27 and 39 are fairly high, the interaction between sources 37 and 38 is negligible. The voltage from the source 38 is applied to the control grid of vacuum tube 30, thus the resistance of the anode-cathode path of vacuum tube 32 will change to allow the second current to flow, and the output voltage will change to draw the algebraic sum of the currents through resistor 29. The voltage gain of the amplifier for the voltage from source 38 will be the ratio of the resistances of resistors 29 and 39 and is independent of the gain for the source 37. The output voltage is the algebraic sum of the amplified voltages from the sources 37 and 38.

The charge of a capacitor is equal to the capacitance multiplied by the applied voltage; thus, the current through a capacitor is equal to the capacitance multiplied by the derivative or time rate of change of the applied voltage. If the resistor 39 be replaced by a capacitor, the current flowing in resistor 29 will be proportional to the derivative or time rate of change of the voltage from the source 38. The output voltage of the amplifier will then have a component proportional to the time rate of change of the voltage from the source 38. If the applied voltage is positive and decreasing, or negative and increasing, the component of the output voltage will be positive; if the applied voltage is positive and increasing or negative and decreasing, the component of the output voltage will be negative.

Figure 3:
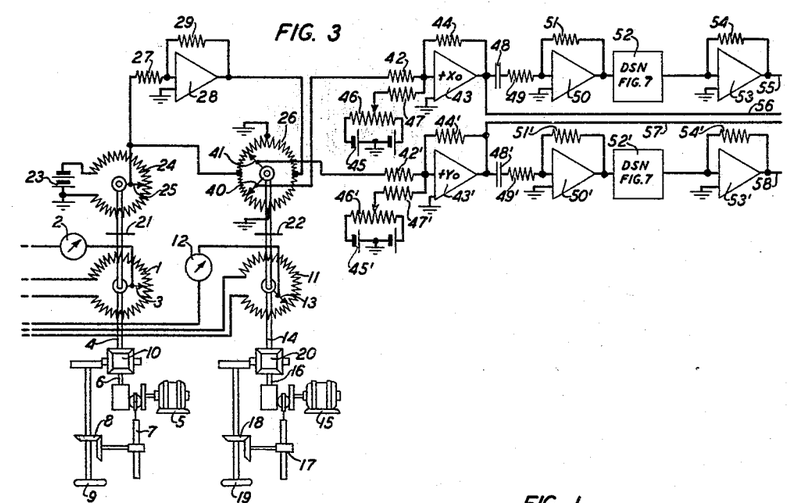
Fig. 3 schematically shows a system controlled by observations to produce voltages proportional to the rectangular coordinates of the target.

The output circuit of amplifier 28, Fig. 3, is connected to a tap in the potentiometer winding 26 diametrically opposite to the first tap. Equidistant, intermediate taps of the winding 26 are grounded. The potentiometer winding 26 has a sinusoidal variation of resistance.

The potentiometer windings 1, 11, 24, 26 and the other windings in the system may conveniently be in the usual form of thin cards of suitable material closely and evenly wound with resistance wire. One edge of the cards is straight and the wire is bared to make a good contact with the brush; the other edge is shaped to vary the width to give the desired variation in the voltage selected by the brush. The cards are supported concentrically with the center of rotation of the brush. The variation in the widths of the cards has been indicated in the drawings by the length of the zigzag lines.

In order to clearly show the brushes and connections, the potentiometers have been shown turned 90 degrees with respect to the driving shaft. When the brushes are continuously changed during the operation of the computer, a circular potentiometer is shown; when the brushes are set to a constant value, a straight potentiometer is usually shown, though such potentiometers may be circular if desired.

In Fig. 1, the target is in the third quadrant, thus, by the usual conventions, the sine and cosine of the azimuth are negative and the coordinates, X and Y of the target should be negative. However, it is preferable that the output voltages of amplifiers 43, 43', Fig. 3, should have the correct conventional polarities, which, in this case are negative, and as amplifiers 43, 43' reverse the polarities of the applied voltages, the applied voltages should be positive. The brushes 40, 41 are rotated by shaft 14 proportionally to the azimuth AT of the target $T_o$ with respect to the station A. As the voltage applied to the potentiometer winding 26 is proportional to the distance $AT_o$, the brushes 40, 41 respectively select positive voltages proportional to the X and Y coordinates of the target $T_o$ with respect to the station A.

The brush 40 is connected through a resistor 42 to the input circuit of an amplifier 43, of the type shown in Fig. 6, having a feedback resistor 44.

The origin of coordinates may be moved from the point of observation A to the pivot gun G1, by adding to the X and Y coordinates of the target with respect to the point of observation A, the coordinates $X_A$ and $Y_A$, of the point of observation A with respect to the gun G1.

A source of voltage 45, having an intermediate tap grounded, is connected across the winding of a potentiometer 46. The brush of potentiometer 46 is connected through a resistor 47 to the input circuit of amplifier 43 and is adjusted to select a positive voltage proportional to $X_A$. The output voltage of amplifier 43 will be equal to $-(+X+X_A)$, or $-X_o$, the X coordinate of the present position of the target with respect to the pivot gun.

Similarly, the brush 41 is connected through a resistor 42' to the input circuit of an amplifier 43', of the type shown in Fig. 6, having a feedback resistor 44'. A source of voltage 45', having an intermediate tap grounded, is connected across the winding of a potentiometer 46'. The brush of potentiometer 46' is connected through resistor 47' to the input circuit of amplifier 43'. The brush of potentiometer 46' is adjusted to select a positive voltage proportional to $Y_A$. Thus the output voltage of amplifier 43' is proportional to $-Y_o$.

The output circuit of amplifier 43 is connected through a capacitor 48 and resistor 49 to the input circuit of an amplifier 50, of the type shown in Fig. 6, having a feedback resistor 51.

Similarly, the output circuit of amplifier 43' is connected through a capacitor 48' and resistor 49' to the input circuit of an amplifier 50', of the type shown in Fig. 6, having a feedback resistor 51'.

The target shown in Fig. 1 is moving east and south from $T_o$ to $T_p$. Thus, using the usual convention, for the conditions shown, the X rate is positive and the Y rate negative. The output voltage of amplifier 43 is of negative polarity and decreasing magnitude; thus the output voltage of amplifier 50 is proportional to $-\dot{X}$. The output voltage of amplifier 43' is of negative polarity and increasing magnitude; thus the output voltage of amplifier 50' is proportional to $+\dot{Y}$.

Figure 7:
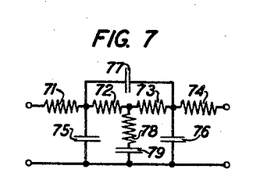
Fig. 7 schematically shows a network used in Fig. 3.

The output circuit of amplifier 50 is connected to a data smoothing network 52, of the type shown in Fig. 7. The output circuit of amplifier 50' is similarly connected to a data smoothing network 52', of the type shown in Fig. 7.

The network shown in Fig. 7 includes the series resistors 71, 72, 73, 74, the shunt capacitors 75, 76, the bridged T capacitor 77, and the shunt arm formed by resistor 78 in series with capacitor 79. Together with resistor 49, Fig. 3, this network produces a current proportional to a smoother value of the applied voltage, weighted over a designed time interval in the immediate past.

The output circuit of network 52 is connected to the input circuit of an amplifier 53, of the type shown in Fig. 6, having a feedback resistor 54. Similarly, the network 52' is connected to the input circuit of an amplifier 53' of the type shown in Fig. 6, having a feedback resistor 54'. The amplifiers 53, 53' reverse the polarities of the voltages from the networks 52, 52'.

Thus, the potentials with respect to ground of the connections 55, 56, 57, 58 are respectively proportional to $+\dot{X}$, $-X_o$, $-Y_o$ and $-\dot{Y}$.

During the time interval between the last observation and a hit, the target will move from $T_o$ to $T_p$, Fig. 1, producing the changes $+DX$ and $-DY$ in the coordinates. The time interval will normally be the time of flight, TF, of the shell, as the observations are taken continuously up to the instant of firing. In some cases, however, the data transmission system may be disabled, and, in these cases, the observations are telephoned to the operator at regular intervals of, say, five seconds. In such cases the time interval will be the sum of the time of flight TF and the dead time TD. Thus $+DX=+\dot{X}(TF+TD)$ and $-DY=-\dot{Y}(TF+TD)$.

Figure 5A:
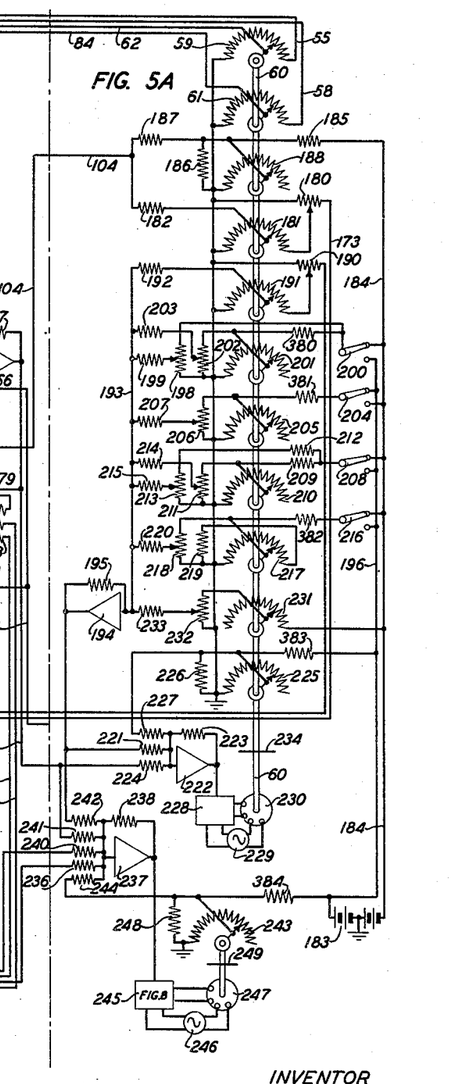
Figs. 5A, 5B, 5C schematically shows systems for indincating the elevation angles of the guns.
Figure 5B:
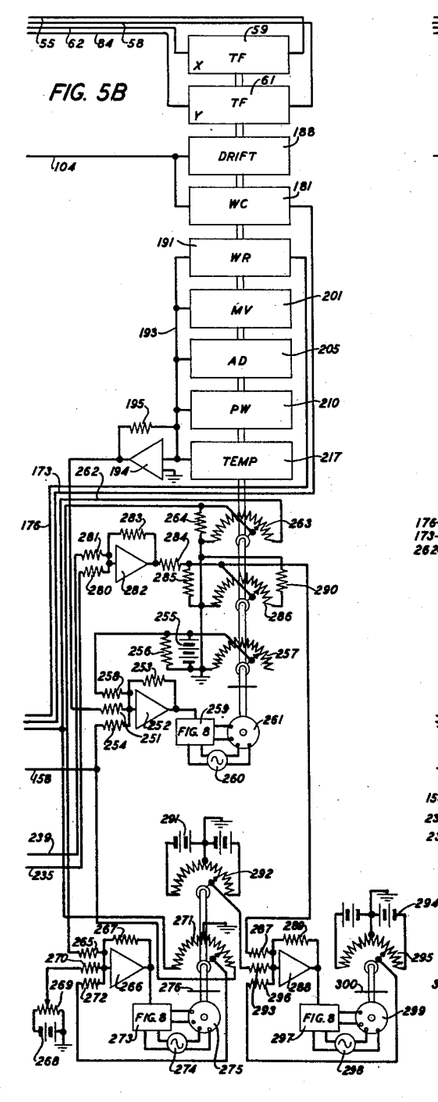
Figure 5C:
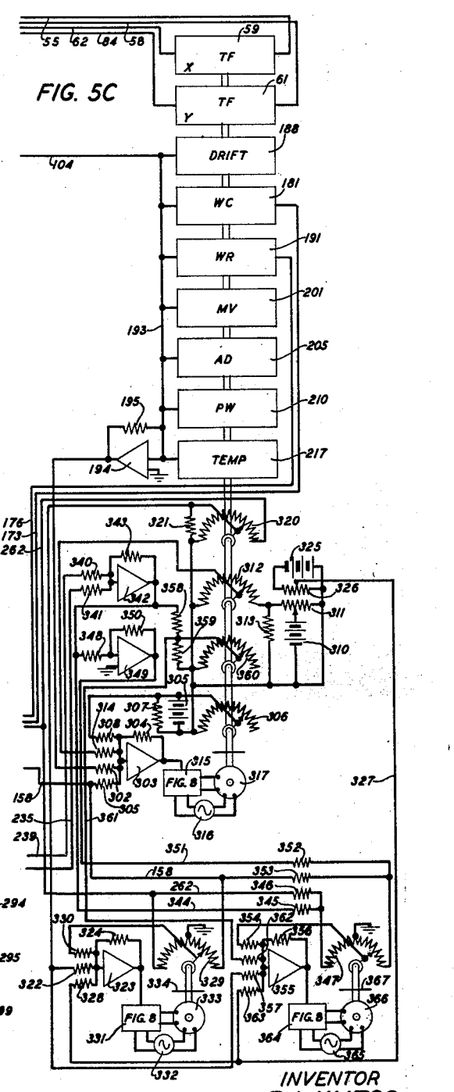

Connection 55 is connected through the winding of a potentiometer 59, Figs. 5A, 5B, 5C, to ground. The brush of potentiometer 59 is moved by shaft 60, as explained hereinbelow, proportionally to the elevation angle of the pivot gun, G1. Similarly, connection 58 is connected through the winding of a potentiometer 61, Figs. 5A, 5B, 5C to ground. The brush of potentiometer 61 is also moved by shaft 60. The cards of potentiometers 59, 61 are shaped in accordance with the values of the time of flight for elevation angle given in the firing tables for the gun and ammunition used, so that the voltages selected by the brushes are proportional to the time of flight, TF. Voltages cannot easily be multiplied; thus, the voltage gains of amplifiers 50, 53 and 50', 53', Fig. 3, are adjusted to the maximum time of flight TM. The voltages applied to the windings of potentiometers 59, 61 are thus proportional to $+\dot{X}TM$ and $-\dot{Y}TM$ and these are fractionated by potentiometers 59, 61 in the ratio TF over TM to produce $+\dot{X}TF$ and $-\dot{Y}TF$.

Figure 4:
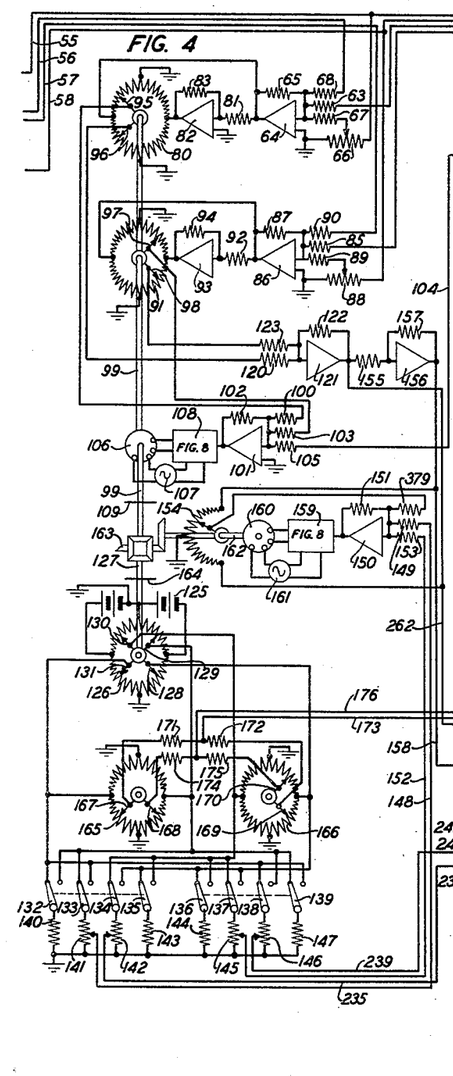
Fig. 4 schematically shows a system for indicating the azimuths of both guns.

The brush of potentiometer 59, Figs. 5A, 5B, 5C is connected by connection 62 and resistor 63, Fig. 4, to the input circuit of an amplifier 64, of the type shown in Fig. 6, having a feedback resistor 65.

Connection 55 is also connected through the winding of a potentiometer 66 to ground. Potentiometer 66 is adjusted to fractionate the applied voltage in the ratio of TD to TM, to produce a voltage proportional to $+\dot{X}TD$. The brush of potentiometer 66 is connected through resistor 67 to the input circuit of amplifier 64.

Connection 56 is connected through resistor 68 to the input circuit of amplifier 64.

The voltages supplied to the input circuit of amplifier 64 are proportional to $-X_o$, $+\dot{X}TF$ and $+\dot{X}TD$. Thus the output voltage of amplifier 64 is proportional to $+X_p$, the negative of the coordinate of the predicted position of the target.

The output circuit of amplifier 64 is connected to a tap in the potentiometer winding 80, and, through resistor 81, to the input circuit of a unity gain amplifier 82, of the type shown in Fig. 6, having a feedback resistor 83. The output circuit of amplifier 82 is connected to a diametrically opposite tap in the winding 80. Equidistant, intermediate taps of the winding 80 are grounded.

The winding 80 has a sinusoidal variation in resistance.

The brush of potentiometer 61, Figs. 5A, 5B, 5C is connected by connection 84 and resistor 85, Fig. 4, to the input circuit of an amplifier 86 of the type shown in Fig. 6 having a feedback resistor 87.

Connection 58 is also connected through the winding of potentiometer 88 to ground. The brush of potentiometer 88 selects a voltage proportional to $-Y_{TD}$ and is connected through resistor 89 to the input circuit of amplifier 86.

Connection 57 is connected through resistor 90 to the input circuit of amplifier 86.

The output voltage of amplifier 86 will be proportional to $+Y_p$, the negative of a coordinate of the predicted position of the target.

The output circuit of amplifier 86 is connected to a tap in the potentiometer winding 91, and, through resistor 92, to the input of a unity gain amplifier 93, of the type shown in Fig. 6, having a feedback resistor 94. The output circuit of amplifier 93 is connected to a diametrically opposite tap in the winding 91 and equidistant, intermediate taps are grounded. The winding 91 has a sinusoidal variation in resistance.

In Fig. 1, the gun is fired along a line $G1T_f$, having an azimuth $AF1$ such that the shell deflected by the sum of the deflection effects $-SD$ will hit at the predicted position of the target $T_p$. In the present computer, ballistic effects which cause the shell to fall on the right of the line of fire are represented by negative voltages. In the present case, the drift of the shell due to the rifling, is to the right, and, as shown in Fig. 1, the effect of the crosswind is to the right, thus SD, the sum of the deflection effects is negative. Let the coordinates of the point $T_f$ be $-X_f$ and $-Y_f$, and the coordinates of the point $T_p$ be $-X_p$ and $-Y_p$.

Then $-X_f \cos AF1 + Y_f \sin AF1 = 0$.

But,
$$-X_f = -X_p - SD \cos AF1$$
$$+Y_f = +Y_p - SD \sin AF1$$
$$(-X_p - SD \cos AF1) \cos AF1 + (Y_p - SD \sin AF1) \sin AF1 = 0 - X_p \cos AF1 + Y_p \sin AF1 - SD = 0$$

The brushes 95, 96, 97, 98 are rotated by the shaft 99 but are insulated therefrom and from each other. As described below, the shaft 99 is rotated proportionally to the azimuth $AF1$.

Brush 95 selects a voltage proportional to $-X_p \cos AF1$ and is connected through resistor 100 to the input circuit of an amplifier 101, of the type shown in Fig. 6, having a feedback resistor 102. Brush 97 selects a voltage proportional to $+Y_p \sin AF1$ and is connected through resistor 103 to the input circuit of amplifier 101. As explained below, a voltage proportional to $-SD$ is supplied by connection 104 through resistor 105 to the input circuit of amplifier 101. From Equation 1, the sum of these voltages should be zero, and, if this sum is not zero, a voltage will be produced in the output circuit of amplifier 101.

Figure 8:
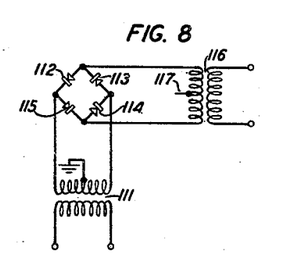
Fig. 8 schematically shows a phase controlling network used in Figs. 4, 5A, 5B, 5C.

The output circuit of amplifier 101 is connected to a phase controlling network 108, of the type shown in Fig. 8. A source of two-phase power 107 has one phase connected directly to one phase winding of a two-phase motor 106 and the other phase connected through the phase controlling network 108 to the other phase winding of motor 106.

The phase controlling network 108 has a bridge of non-linear resistance elements 112, 113, 114, 115 which may be copper-copper oxide couples. The arrows indicate the direction of flow of a biasing current to make the elements of low resistance. Transformers 111 and 116 are connected to conjugate vertices of the bridge. The source of power is connected to transformer 111 and the motor winding to transformer 116.

The output circuit of the amplifier 101 is connected to connection 117 and ground. When no current flows from the amplifier 101, the bridge is balanced, and no power is transmitted from the source to the motor. When current of one polarity flows from the amplifier 101, power of one phase is transmitted from the source to the motor, and when current of the opposite polarity flows from the amplifier 101, power of the opposite phase is transmitted from the source to the motor.

If the output of amplifier 101, Fig. 4, is not zero, power is supplied to the motor 106, turning the shaft 99 and brushes 95, 97 until the output of amplifier 101 is reduced to zero. The shaft 99 has then been turned to the angle $AF1$, which may be indicated on a dial 109 and is sent by any suitable transmission system to the guns.

In Fig. 1 let a second gun, having the coordinates $+X_g$, $-Y_g$, be located at $G2$. Let $G1T_f$, at the azimuth $AF1$, be designated $RF1$, and $G2T_f$, at an azimuth $AF2$, be designated $RF2$. Let the angle $G1T_fG2$ be designated $DA$, as this is evidently the difference, $AF2-AF1$, in the azimuths of the guns.

The gun is fired at the elevation angle for a virtual target $T_v$ such that the range $R_v$ for this elevation with the sum of the ballistic range effects $+SR$ will give the shell a range $RF1$ equal to the distance $G1T_f$.

In the present computer, ballistic effects which cause the shell to travel farther than the normal distance for the given elevation are represented by positive voltages, thus, SR the sum of such range effects, is positive.

Then
$$-X_f \sin AF1 - Y_f \cos AF1 = +RF1$$
$$(-X_p - SD \cos AF1) \sin AF1$$
$$-(Y_p - SD \sin AF1) \cos AF1 = +RF1$$
$$+X_p \sin AF1 + Y_p \cos AF1 = -RF1 \quad (2)$$

In Fig. 4, brush 96 selects a voltage proportional to $+X_p \sin AF1$ and is connected through resistor 120 to the input circuit of an amplifier 121, of the type shown in Fig. 6, having a feedback resistor 122. Brush 98 selects a voltage proportional to $+Y_p \cos AF1$ and is connected through resistor 123 to the input circuit of amplifier 121. The output voltage of amplifier 121 is proportional to $+RF1$.

In Fig. 1, draw $G2k$ and $G2m$ perpendicular to $RF2$ and $ln$ parallel to $RF2$.

$$\text{Angle } nG1k = G2nl = AF2$$
$$G1l = X_g \cos AF2$$
$$ln = X_g \sin AF2$$
$$G2m = lk = -Y_g \sin AF2$$
$$mn = -Y_g \cos AF2$$
$$G1l + lk = G1k = RF1 \sin DA$$
$$X_g \cos AF2 - Y_g \sin AF2 - RF1 \sin DA = 0 \quad (3)$$

Evidently $X_g \cos AF2 - Y_g \sin AF2$ and $-RF1 \sin DA$ are the lateral displacement of gun 1 with respect to the line of fire of gun 2.

In Fig. 4, a source of voltage 125, with midpoint grounded has the positive pole connected to the left-hand tap of a potentiometer winding 126 and the negative pole connected to a diametrically opposite tap. Equidistant, intermediate taps of the winding 126 are grounded. The winding 126 has a sinusoidal variation of resistance.

The brushes 128, 129, 130, 131 are driven by the shaft 127, but are insulated therefrom, and from each other. As explained below, the shaft 127 is rotated proportionally to angle $AF2$. With zero angle at the bottom tap and counter-clockwise rotation for increasing azimuth, the brushes 128, 129, 130, 131, respectively, select voltages proportional to $+\sin AF2$, $+\cos AF2$, $-\sin AF2$, $-\cos AF2$.

Brush 131 is connected through switch 132, resistor 140 and ground to the source 125. Brush 129 is connected through switch 133, winding of potentiometer 141 and ground to the source 125. The current drawn by resistor 140 is substantially equal to the current drawn by the winding of potentiometer 141, thus balancing the currents drawn through winding 126. Brush 129 is also connected to the idle contact of switch 132 and brush 131 is connected to the idle contact of switch 133. The operation of switches 132, 133 will reverse the polarities of the voltages applied to resistor 140 and the winding of potentiometer 141.

The brush of potentiometer 141 is adjusted to select a voltage proportional to $+X_g \cos AF2$ and is connected by connection 148 through resistor 149 to the input circuit of an amplifier 150, of the type shown in Fig. 6, having a feedback resistor 151.

Brush 128 is connected to the idle contact of switch 137 and through switch 136, resistor 144, and ground back to the source 125. Brush 130 is connected to the idle contact of switch 136 and through switch 137, winding of potentiometer 145 and ground back to the source 125. Switches 136, 137 may be operated to reverse the polarities of the voltages supplied to resistor 144 and the winding of potentiometer 145. The brush of potentiometer 145 is adjusted to select a voltage proportional to $-Y_g \sin AF2$ and is connected by connection 152 and resistor 153 to the input circuit of amplifier 150.

The output circuit of amplifier 121 is connected by connection 262 to the lower end of the winding of potentiometer 154 and through resistor 155 to the input circuit of a unity gain amplifier 156, of the type shown in Fig. 6, having a feedback resistor 157. The output circuit of amplifier 156 is connected to the upper end of the winding of potentiometer 154. The winding of potentiometer 154 has a sinusoidal variation of resistance and the mid-point is grounded.

The output circuit of amplifier 150 is connected to a phase controlling network 159 of the type shown in Fig. 8. A source of two-phase power 161 has one phase connected directly to one phase winding of a two-phase motor 160, and the other phase connected through phase controlling network 159, of the type shown in Fig. 8, to the other phase winding of motor 160.

The brush of potentiometer 154 is connected through resistor 379 to the input circuit of amplifier 150 and will select a voltage approximately proportional to $-RF1 \sin DA$. The voltages supplied to amplifier 150 thus are proportional to $X_g \cos AF2 - Y_g \sin AF2 - RF1 \sin DA$ and, from Equation 2, the sum of these voltages should equal zero. If the sum is not zero, current will be supplied to the network 159, supplying power to the motor 160 which moves shaft 162 and the brush of potentiometer 154, changing the value of the voltages selected, until the sum of the voltages is equal to zero. The shaft 162 is thus rotated through the angle $DA$.

As previously described, the shaft 99 is rotated through the angle $AF1$, and is connected to a pinion of differential gear 163. The shaft 162 is rotated through the angle $DA$ and is geared to the ring gear of differential 163. The shaft 127 is connected to the other pinion of differential 163 and will thus be rotated through the angle $AF1 + DA = AF2$. Equation 2 may be expressed in the form $$X_g \cos AF2 - Y_g \sin AF2 - RF1 \sin (AF2 - AF1) = 0$$

and the rotation of shafts 127 and 162 changes the value of $AF2$ until the sum of the voltages is reduced to zero. The rotation of shaft 127 may be indicated by a dial 164 and is transmitted by any known data transmission system to the crew of gun 2.

The direction of the wind, measured as a bearing $WB$ from north clockwise, and the magnitude $W$ of a weighted average of the wind velocity, is supplied at regular intervals to the operator of the converter.

In Fig. 1, $-WC = W \sin (WB - AF2 + DA)$
$\quad = -W \sin WB \cos (AF2 + DA) - W \cos WB \sin (AF2 + DA)$
$\quad = -W (\sin WB \cos AF2 - \cos WB \sin AF2) \cos DA$
$\quad \quad -W (\sin WB \sin AF2 + \cos WB \cos AF2) \sin DA.$ As $DA$ is a small angle, $\cos DA \doteq 1$, $\sin DA \doteq 0$, thus $$-WC \doteq W(-\cos AF2 \sin WB + \sin AF2 \cos WB) \quad (4)$$

Similarly, $$WR = W(\cos AF2 \cos WB + \sin AF2 \sin WB) \quad (5)$$

In Fig. 4, brushes 129, 131 are connected to diametrically opposite taps in a potentiometer winding 165, intermediate, equidistant taps being grounded. The winding 165 has a sinusoidal variation of resistance.

Brushes 128, 130 are connected to diametrically opposite taps in a potentiometer winding 166, equidistant intermediate taps being grounded. The winding 166 has a sinusoidal variation of resistance.

The brushes 167, 168 are mounted at right angles on a common shaft, but are insulated from the shaft and each other. Similarly, the brushes 169, 170 are mounted at right angles on a common shaft, but are insulated from the shaft and each other.

Brushes 167 and 169 are respectively connected through resistors 171, 172 to connection 173. Brushes 168 and 170 are respectively connected through resistors 174, 175 to connection 176. Resistors 171, 172 and 174, 175 reduce interactions between the brush circuits.

With zero angle at the upper ground, and clockwise rotation, brushes 167, 168, 169, 170 are manually rotated through the wind bearing $WB$ and respectively select voltages proportional to $-\sin WB$, $+\cos WB$, $+\cos WB$, $+\sin WB$. Thus the voltage supplied to connection 173 is proportional to $-\sin WB \cos AF2 + \cos WB \sin AF2$, that is, to the maximum value of the crosswind; and the voltage supplied to the connection 176 is proportional to $+\cos WB \sin AF2 + \sin WB \sin AF2$, the maximum value of the range wind.

Connection 173 is connected through the winding of potentiometer 18J, Fig. 5A, to ground. The brush of potentiometer 180 is manually adjusted to select a voltage proportional to W, the magnitude of the wind and is connected through the winding of potentiometer 181 to ground. The magnitude of the effect of the wind on the shell will depend upon the time of flight of the shell, and, as the time of flight of the shell varies with the elevation angle, the magnitude of this effect will also vary with the elevation angle. The brush of potentiometer 181 is rotated by the shaft 60 proportionally to the elevation angle of the pivot gun to select a voltage —WC varying with the elevation. The brush of potentiometer 181 is connected through resistor 182 to connection 104.

A source of voltage 183, with mid-point grounded, has the negative pole connected by connection 184, through resistors 185 and 186 to ground, and through resistor 187 to connection 104. The adjustable resistor 188 is connected in parallel with resistor 186, and has a resistance variation such that when the brush is rotated by shaft 60 the voltage supplied to connection 104 will vary as the drift —D. The voltage supplied to resistor 105, Fig. 4, thus is proportional to —WC—D which equals —SD.

Connection 176 is connected through the winding of potentiometer 190 to ground. The brush of potentiometer 190 is adjusted to select a voltage proportional to the magnitude W of the wind, and may be ganged with the brush of potentiometer 180.

The brush of potentiometer 190 is connected through the winding of potentiometer 191 to ground. The brush of potentiometer 191 is connected through resistor 192 and connection 193 to the input circuit of an amplifier 194, of the type shown in Fig. 6, having a feedback resistor 195.

The potentiometer 191 selects a voltage varying with the elevation angle, proportional to WR, the range component of the effect of the wind.

The elevation angle of the gun when firing at a real or virtual target in the same horizontal plane as the gun may be termed the ballistic elevation angle B. The time of flight, TF, of the shell may be expressed as a function of the angle B, thus, the change DX may be represented by a term $\dot{X}f1\,(B)$, and the change —DY by a term $-\dot{Y}f2(B)$. In Equation 2, $$+X_p \sin AF1 + Y_p \cos AF1 = -RF1,$$

thus $$[X_o - \dot{X}f1(B)] \sin AF1 + [Y_o + \dot{Y}f2(B)] \cos AF1 = -RF1$$

The gun must be elevated to a ballistic elevation angle which, under standard conditions, would cause the shell to travel the range $R_v$ to a virtual target $T_v$ and, under non-standard conditions causes the shell to travel the added distance SR, the algebraic sum of the wind and differential ballistic effects. The range $R_v$ is tabulated in the firing tables and may be expressed as a function $f_3(B)$ of the ballistic elevation angle B. The ballistic range effects are also tabulated in the firing tables and may be expressed as a function $f_4(B)$ of the angle B.

The balance equation for the ballistic elevation angle B will thus be $$-RF1 + f_3(B) + f_4(B) = 0 \qquad (6)$$

As the voltage representing RF1 is of negative polarity, the voltage representing the distance to the virtual target $R_v = f_3(B)$, is of positive polarity, and ballistic effects which increase the distance travelled by the shell will also be of positive polarity. As the voltages proportional to SR are first added in the summing amplifier 194, and thus are reversed in polarity, the voltages representing these ballistic effects, as generated, are of negative polarity for effects which increase the distance travelled by the shell, and of positive polarity for effects which decrease the distance.

If the muzzle velocity of the gun is higher than normal, the shell will travel farther than normal and the effect will have a negative polarity. The values of this effect, as given in the firing tables, are readily matched by a negative voltage varying with the elevation angle and muzzle velocity. Thus, for a muzzle velocity higher than normal, the negative pole of the source 183 is connected by connection 184, through switch 200 and the winding of potentiometer 198 to ground. The brush of potentiometer 198 is connected through resistor 199 to connection 193 and amplifier 194.

The negative pole of source 183 is also connected by connection 184, switch 200 and resistor 380 to the brush of adjustable resistor 201 and the winding of potentiometer 202. The brush of potentiometer 202 is connected by resistor 203 to connection 193.

The brushes of potentiometers 198 and 202 are adjusted to the value of the muzzle velocity of the pivot gun and may be ganged together.

If the muzzle velocity is below normal, the switch 200 is moved to the lower contact, thus reversing the polarity of the voltage from the source 183.

If the density of the air is higher than normal the shell will travel less than normal, thus the positive pole of the source 183 is connected by connection 184, switch 204 and resistor 381 to the brush of grounded adjustable resistor 205, and through the windings of resistor 205 and potentiometer 206 to ground. The brush of potentiometer 206 is connected through resistor 207 and connection 193 to amplifier 194, and is adjusted to the value of the density of the air.

If the weight of the projectile is greater than normal, the shell will travel a longer distance than normal and the effect is represented by a positive voltage at output of amplifier 194. The negative pole of the source 183 is connected by connection 184 and switch 208, through resistor 209 to the brush of adjustable resistor 210 and through the windings of adjustable resistor 210 and potentiometer 211 to ground. The blade of switch 208 is also connected through resistor 212 and the winding of potentiometer 213 to ground. The brushes of potentiometers 211, 213 are respectively connected by resistors 214, 215 to connection 193, are manually adjusted to the projectile weight and may be ganged together. The brush of resistor 210 is moved by shaft 60, but is insulated therefrom. If the weight of the projectile is less than normal, switch 208 is operated, reversing the polarity of the applied voltage.

If the temperature is higher than normal, the shell will travel a shorter distance than normal and the effect is represented by a negative voltage. The negative pole of source 183 is connected by connection 184 to the upper contact of switch 216, and the positive pole is connected by connection 196 to the lower contact of switch 216. The blade of switch 216 is connected through resistor 382 to the brush of potentiometer 217 and through the windings of potentiometers 217, 218 to ground. The upper end of the winding of potentiometer 217 is connected through resistor 219 to ground. The brush of potentiometer 217 is moved by shaft 60 but is insulated therefrom. The brush of potentiometer 218 is connected through resistor 220 to connection 193 and is manually adjusted to the temperature.

The various resistors and potentiometers are so connected in the circuit that the proper variations of voltage for the different effects are obtained from cards having a linear variation of resistance. Any slight discrepancy between the variation of voltage and the tabulated values for a given effect may be corrected by a corresponding change in the shape of the card.

Thus, voltages proportional to the differential ballistic effects are supplied to the connection 193, added together and reversed in polarity by the amplifier 194. The output circuit of amplifier 194 is connected through resistor 221 to the input circuit of an amplifier 222, of the type shown in Fig. 6, having a feedback resistor 223.

The output circuit of amplifier 156, Fig. 4, is connected by connection 158 through resistor 224 to the input circuit of amplifier 222.

The positive pole of source 183 is connected through resistor 383 to the brush of grounded adjustable resistor 225, through resistor 226 to ground, and through resistor 227 to the input circuit of amplifier 222. The brush of resistor 225 is moved by shaft 60 but is insulated therefrom.

The output circuit of amplifier 222 is connected to a phase controlling network 228, of the type shown in Fig. 8. One phase of a two-phase source of power 229 is connected directly to one phase winding of a two-phase motor 230, and the other phase is connected through the network 228 to the other phase winding of the motor 230.

The voltages supplied to the input circuit of amplifier 222 are proportional to $-R_f$, the firing range to the predicted position of the target, $+R_v$, the range to the virtual target and $\pm SR$, the sum of the ballistic effects, positive polarity showing that the effects aid the flight of the shell and negative polarity that the effects retard the flight of the shell.

If the output of amplifier 222 is not zero, motor 230 will rotate shaft 60, moving the wipers of potentiometers 59, 61 and changing the value of the voltage representing $-R_f$, moving the wipers of potentiometer 191 and resistors 201, 205, 210, 217 changing the value of the voltage, representing $\pm SR$, and moving the brush of resistor 225 changing the value of the voltage representing $+R_v$, until the output voltage of amplifier 222 is reduced to zero and the shaft 60 has moved through the angle B, the elevation angle of the gun for a ballistic range $+R_v$, which, with the effects $\pm SD$ equals the horizontal range RF1.

If the target is below or above the horizontal plane of the pivot gun G1, as shown in Fig. 2, a shell fired at the ballistic elevation angle B will pass through the horizontal plane at the horizontal range $R_B$ and will hit a fictitious target $T_B$ which is past the real target $T_P$. The true firing range RF1 is measured along the slant line G1$T_P$. If the difference in elevation, or height of site, H, is not too large, $R_B$ and RF1 are substantially equal.

The angle of arrival A for the ballistic elevation angle B is tabulated in the firing tables, and the distance $T_PT_B$ is then approximately H tan A. The angle of arrival A is a function of the ballistic elevation B, thus tan $A = f5(B)$. and the correction for the height of site $H.S. = Hf5(B)$. The ballistic range $R_B$, or its equivalent RF1, may then be reduced by the distance $T_PT_B$ to give the range for the firing elevation angle E1. As the balance equation for motor 230, Fig. 5A, is $$R_v \pm SR - RF1 = 0$$

a voltage H. S., proportional to $T_PT_B$, may be added to the voltage $\pm SR$, to make the new balance equation $+R_v \pm SR + H.S. - RF1 = 0$, thus causing the motor 230 to rotate shaft 60 to the firing elevation angle E1.

Thus, in Fig. 5A, for angles of depression, the negative pole of the source 183 is connected through the winding of potentiometer 231 to ground. The brush of potentiometer 231 is connected through the winding of potentiometer 232 to ground. The brush of potentiometer 232 is connected through resistor 233 to the input circuit of amplifier 194 and is manually adjusted to the height of site H. The winding of potentiometer 231 has a variation of resistance such that the voltage selected by the brush of potentiometer 232 is proportional to $Hf5(B)$. A voltage proportional to the height of site H is thus added to the voltages supplied to amplifiers 194 and 222, causing motor 230 to rotate to the firing elevation angle for the pivot gun, which may be indicated by dial 234 and transmitted by any desired system, such as a self-synchronizing data system, to the guns.

The rotation of shaft 60 to the firing elevation angle E1, instead of the ballistic elevation angle B, changes the positions of the brushes of the time of flight potentiometers 59, 61, and of the various potentiometers and resistors which produce the ballistic voltages SD and SR, and thus produces a small error. However, if the height of site H is small, this error is also small and within permissible limits.

In Fig. 1, $RF2 = T_fk + ln - mn$ thus, $$RF2 = RF1 \cos DA + X_g \sin AF2 + Y_g \cos AF2$$

$$RF2 - RF1 = X_g \sin AF2 +$$
$$Y_g \cos AF2 - RF1(1 - \cos DA)$$

$$= X_g \sin AF2 +$$
$$Y_g \cos AF2 - \frac{RF1}{2} \sin^2 DA \left(\frac{1}{\cos^2 \frac{DA}{2}}\right)$$

$$RF1 - RF2 \doteq -X_g \sin AF2 - Y_g \cos AF2 +$$
$$\frac{RF1}{2} \sin^2 DA \quad (7)$$

If the separation between the guns, M, is less than say a quarter mile, the term $$\frac{RF1}{2} \sin^2 DA$$

is small and may be neglected. If the separation is greater than a quarter mile, a potentiometer, supplied with voltages from amplifiers 121, 156, and having a winding varying in resistance with $\sin^2 DA$, may be mounted so that the brush is moved by motor 160, and the voltage selected combined with the other two voltages.

In Fig. 4, the brush 130 is connected to the active contact of switch 134 and the idle contact of switch 135 while the brush 128 is connected to the idle contact of switch 134 and the active contact of switch 135. The blade of switch 134 is connected through the winding of potentiometer 142 to ground and the blade of switch 135 is connected through the balancing resistor 143 to ground. The brush of potentiometer 142 is manually adjusted to select a voltage proportional to $-X_g \sin AF2$, and is connected by connection 235, through resistor 236, Fig. 5A, to the input circuit of an amplifier 237, of the type shown in Fig. 6, having a feedback resistor 238.

In Fig. 4, the brush 131 is connected to the active contact of switch 138 and the idle contact of switch 139, while brush 129 is connected to the idle contact of switch 138 and the active contact of switch 139. The blade of switch 138 is connected through the winding of potentiometer 146 to ground and the blade of switch 139 is connected through the balancing resistor 147 to ground. The brush of potentiometer 146 is manually adjusted to select a voltage proportional to $$-Y_g \cos AF2$$

and is connected by connection 239 through resistor 240 to the input circuit of amplifier 237.

The brushes of potentiometers 141, 142 and of potentiometers 145, 146 may be ganged together; the blades of switches 132, 133, 134, 135 and of switches 136, 137, 138, 139 may also be ganged together.

The output circuit of amplifier 156, Fig. 4, is connected by connection 158, through resistor 241, Fig. 5A, to the input circuit of amplifier 237.

The output circuit of amplifier 194 is connected through resistor 242 to the input circuit of amplifier 237.

The positive pole of the source 183 is connected through resistor 384 to the brush of grounded variable resistor 243; through resistor 248 to ground; and through resistor 244 to the input circuit of amplifier 237. The winding of resistor 243 is so proportioned that the voltage supplied to amplifier 237 is proportional to $R_{V2}$, the range to the virtual target for gun 2.

The output circuit of amplifier 237 is connected to a phase controlling network 245 of the type shown in Fig. 8. A source of two-phase power 246 is connected directly to one phase winding of the two-phase motor 247, and through the phase controlling 245, to the other phase winding of motor 247. The brush of resistor 243 is driven by the shaft of motor 247 but is insulated therefrom.

The voltages supplied to amplifier 237 represent $-RF1+(RF1-RF2)+SR+H.S.+R_{V2}$, and, if the sum of these voltages is not zero, motor 247 changes the value of $R_{V2}$ until the sum is zero, and the shaft of motor 247 is turned to the firing elevation angle $E_2$ for gun 2. This angle $E_2$ may be indicated, as by dial 249, and sent in known manner to the gun crew.

The firing elevation angle $E_2$ for gun 2 is based on the assumption that the heights of site for guns 1 and 2 are substantially the same.

When the height of site is large enough that the errors in the system of Fig. 5A are too large, the system of Fig. 5B may be used. The time of flight potentiometers 59, 61, Fig. 5B, are associated with Fig. 4 similarly to the potentiometers in Fig. 5A. As before, the voltages from potentiometers 181, 188 proportional to the deflection effects are supplied to amplifier 101, Fig. 4, by connection 104.

The voltages proportional to the ballistic range effects due to wind, muzzle velocity, air density, projectile weight and temperature, but not height of site, are supplied by connection 193 to the input circuit of amplifier 194. The output circuit of amplifier 194 is connected through resistor 251 to the input circuit of an amplifier 252, of the type shown in Fig. 6, having a feedback resistor 253.

The output circuit of amplifier 156, Fig. 4, is connected by connection 158, through resistor 254 to the input circuit of amplifier 252.

A grounded source of voltage 255 has the positive pole connected to the brush of a grounded adjustable resistor 257; through resistor 256 to ground; and through resistor 258 to the input circuit of amplifier 252.

The output circuit of amplifier 252 is connected to a phase controlling network 259, of the type shown in Fig. 8. A source of two-phase power 260 is connected directly to one phase winding of a two-phase motor 261, and through the network 259 to the other phase winding of motor 261. The brush of resistor 257 is driven by the shaft of motor 261, but is insulated therefrom.

The voltages supplied to amplifier 252 are proportional to $-RF1+SR+R_B$, thus the motor 261 rotates through the ballistic elevation angle B, the elevation which will cause the shell to travel to the range RF1 in the horizontal plane.

The ballistic elevation angle B is the correct angle of rotation for the brushes of the time of flight potentiometers 59, 61, and the brushes of the ballistic potentiometers and resistors.

From Fig. 2, the angle of site $$P = \tan^{-1} \frac{H}{R_B}$$

But $$R_B \doteq RF1, \text{ thus } P = \sin^{-1} \frac{H}{RF1} \doteq \frac{H}{RF1}$$

From the principle of the rigidity of the trajectory, $$E1 = B - P; \text{ thus } E1 \doteq B - \frac{H}{RF1}$$

or $$RF1 \cdot B - H - RF1 \cdot E1 = 0 \tag{8}$$

The output circuit of amplifier 121, Fig. 4, is connected by connection 262 through the winding of potentiometer 263 to ground. The brush of potentiometer 263 is connected through resistor 264 to ground and through resistor 265 to the input circuit of an amplifier 266, of the type shown in Fig. 6, having a feedback resistor 267.

A source of voltage 268, with positive pole grounded, is connected across the winding of potentiometer 269. The brush of potentiometer 269 is adjusted to the value of the height of site H, and is connected through resistor 270 to the input circuit of amplifier 266.

Connections 158 and 262 are connected to the ends of the winding of potentiometer 271, an intermediate point of this winding being grounded. The brush of potentiometer 271 is connected through resistor 272 to the input circuit of amplifier 266.

The output circuit of amplifier 266 is connected to a phase controlling network 273 of the type shown in Fig. 8. A source of two-phase power 274 is connected directly to one phase winding of a two-phase motor 275, and, through the network 273 to the other phase winding of motor 275. The brush of potentiometer 271 is driven by the shaft of motor 275 but is insulated therefrom.

The voltages supplied to amplifier 266 are proportional to $RF1 \cdot B - H - RF1 \cdot E1$ and if the sum of these voltages is not zero, motor 275 moves the brush of potentiometer 271 to change the voltage proportional to $-RF1 \cdot E1$ until the sum is zero and the shaft of motor 275 has moved to the angle E1, the firing elevation angle for gun 1, which may be indicated on dial 276 and is sent by known means to the crew of gun 1.

The range of a gun, as tabulated in the firing tables, is a function of the ballistic elevation angle, thus, $E_2 - E_1 = (RF2 - RF1) f(B)$. This function of the ballistic elevation angle B is substantially linear. Now $(E_2 - E_1) + E_1 - E_2 = 0$, thus $(RF2 - RF1) f(B) + E_1 - E_2 = 0$.

In Fig. 5B, connections 235, 239 are respectively connected through resistors 280, 281 to the input circuit of an amplifier 282, of the type shown in Fig. 6, having a feedback resistor 283. The output voltage of amplifier 282 will then be proportional to (RF2—RF1).

The output circuit of amplifier 282 is connected through resistors 284, 285 to ground; to the brush of the grounded winding of potentiometer 286; and through resistor 287 to the input circuit of amplifier 288, of the type shown in Fig. 6, having a feedback resistor 289. The free end of the winding of potentiometer 286 is connected to ground through resistor 290.

A source of voltage 291, having an intermediate point grounded, is connected across the winding of potentiometer 292. An intermediate point of this winding is grounded. The brush of potentiometer 292 is moved by the shaft of motor 275, but is insulated therefrom, and is connected through resistor 293 to the input circuit of amplifier 288.

A source of voltage 294, having an intermediate point grounded, is connected across the winding of a potentiometer 295. An intermediate tap of this winding is grounded. The brush of potentiometer 295 is connected through resistor 296 to the input circuit of amplifier 288.

The output circuit of amplifier 288 is connected to a phase controlling network 297, of the type shown in Fig. 8. A source of two-phase power has one phase connected directly to one phase winding of a two-phase motor 299, and the other phase connected through the network 297 to the other winding of motor 299. The brush of potentiometer 295 is driven by the shaft of motor 299, but is insulated therefrom.

If the output voltage of amplifier 288 is not zero, motor 299 drives the brush of potentiometer 295 until the output is zero. The shaft of motor 299 has thus been moved to the angle $E_2$, the firing elevation for gun 2, which may be indicated on a dial 300 and is sent by known means to the gun crew.

If the motor circuits are fairly sensitive the motors 275 and 299 may oscillate or hunt between two turns of the windings of potentiometers 271 and 295. As motor 299 is in cascade with motor 275, it is affected by the hunting of both motors, and the dial readings may quiver enough to be unpleasant. As shown in Fig. 5C, this difficulty may be avoided by driving the $E_1$ and the $E_2$ motors independently from the B motor circuits.

In the system of Fig. 5B, the computations are based upon the assumption of the rigidity of the trajectory. This assumption is fairly accurate for some weapons, but may produce serious errors with other weapons. Various expressions have been given for this error, one authority stating that the true range is to the computed range as $$\frac{1 - \tan B \tan P}{\cos P}$$

is to unity. Thus for two guns, $$E_1 = B_1 - P_1 + X_1$$
$$E_2 = B_2 - P_2 + X_2$$

where $X_1$ and $X_2$ are terms which are to correct for the error in the assumption. Assume that $X_1 = X_2$, and, as before $B_2 - B_1 = (RF2 - RF1) f(B_1)$. Then $$E_1 = B_1 - P_1 + X_1$$
$$E_2 = B_1 + (RF2 - RF1) f(B_1) - P_2 + X_1$$

The corrective term $X_1$ may be determined by use of the complementary angle of site $E_c$ which is given in the firing tables for the larger weapons. The complementary angle of site is small for medium ranges, but increases very rapidly at extreme range. The complementary angles of site for both guns will be substantially equal, and will vary with the height of site. The correction for the complementary angle of sight may be expressed as a range correction, $$R_c = H \cdot E_c \frac{\partial R}{\partial B}$$

and a voltage proportional to this correction may be supplied to the motor controlling the setting of the ballistic elevation angle.

In Fig. 5C, the time of flight potentiometers 59, 61 are associated, as before, with Fig. 4; the lateral ballistic voltages are supplied to the connection 104 and the range ballistic voltages —SR are supplied to amplifier 194. The output circuit of amplifier 194 is connected through resistor 302 to the input circuit of an amplifier 303, of the type shown in Fig. 6, having a feedback resistor 304.

Connection 158 is connected through resistor 305 to the input circuit of amplifier 303.

A source of voltage 305, with negative pole grounded, is connected to the brush of grounded adjustable resistor 306; across resistor 307; and through resistor 308 to the input circuit of amplifier 303.

A grounded source of voltage 310 has the positive pole connected to the brush of a potentiometer 311. One end of the winding of potentiometer 311 is grounded; the other end is connected through the winding of potentiometer 312, and through resistor 313 to ground. The brush of potentiometer 312 is connected through resistor 314 to the input circuit of amplifier 303. The brush of potentiometer 311 is adjusted to the value of the height of site H.

The output circuit of amplifier 303 is connected to a phase controlling network 315, of the type shown in Fig. 8. A source of two-phase power 316 has one phase connected directly to one winding of a two-phase motor 317 and the other phase through the network 315 to the other winding of motor 317. The brushes of resistor 306 and potentiometer 312 are driven by the shaft of motor 317 but are insulated therefrom.

The voltages supplied to amplifier 303 thus are proportional to $+SR - RF1 + R_v + R_c$ and, if the sum of these voltages is not zero, motor 317 moves the brushes of the ballistic potentiometers and resistors, the brush of resistor 306 and the brush of potentiometer 312 until the sum is zero. The shaft of motor 317 has thus moved to the ballistic elevation angle $B_c$ corrected for the complementary angle of site $E_c$.

Connection 262 is connected to ground through the winding of potentiometer 320. The brush of potentiometer 320 is connected through resistor 321 to ground, and through resistor 322 to the input circuit of an amplifier 323, of the type shown in Fig. 6, having a feedback resistor 324.

A source of voltage 325, with positive pole grounded, is connected across the winding of potentiometer 326. The brush of potentiometer 326 is adjusted to the value of the height of site H, and is connected by connection 327 through resistor 328 to the input circuit of amplifier 323. The brushes of potentiometers 311 and 326 may be ganged together.

Connection 158 is connected to one end of the winding of potentiometer 329 and connection 262 is connected to the other end of the winding. An intermediate point of this winding is grounded. The brush of potentiometer 329 is connected through resistor 330 to the input circuit of amplifier 323.

The voltages supplied to amplifier 323 thus are proportional to $+RF1 \cdot B_c - H - RF1E_1$.

The output circuit of amplifier 323 is connected to the phase controlling network 331, of the type shown in Fig. 8. A source of two-phase power 332 has one phase connected directly to one winding of a two-phase motor 333 and the other phase connected through network 331 to the other winding of motor 333. The brush of potentiometer 329 is moved by the shaft of motor 333 but is insulated therefrom. If the output voltage of amplifier 323 is not zero, motor 333 moves the brush of potentiometer 329 until the output voltage is zero and the shaft of motor 333 has moved to the angle $E_1$, the firing elevation angle for gun 1. This angle may be indicated, as on dial 334, and is sent by known means to the gun crew.

The firing elevation angle $E_2$ of gun 2 will be equal to the corrected ballistic elevation angle $B_c$ plus the difference between the elevation angle $E_1$ of gun 1 and the elevation angle $E_2$ of gun 2 minus the angle of site P. Assuming as before, $$P_2 \doteq \frac{H}{RF2}$$

then $$E_2 = B_c + (E_2 - E_1) - \frac{H}{RF2}$$

or $$-RF2 \cdot E_2 + RF2B_c + RF2(E_2 - E_1) - H = 0$$

The range $-RF2 = -[RF1 + (RF2 - RF1)]$, thus $-RF2 \cdot E_2 = -[RF1 + (RF2 - RF1)]E_2$, and $RF2 \cdot B_c = [RF1 + (RF2 - RF1)]B_c$. The angular elevation difference $E_2 - E_1$, may be expressed as a linear range term $$(RF2 - RF1)\frac{\partial B_c}{\partial R_v}$$

thus $$RF2(E_2 - E_1) = RF2\left[(RF2 - RF1)\frac{\partial B_c}{\partial RB}\right]$$

As $RF2 \doteq R_v$ is a good approximation for this calculation $$RF2(E_2 - E_1) = R_v\left[(RF2 - RF1)\frac{\partial B_c}{\partial R_v}\right]$$

The terms $$(RF2 - RF1)B_c \text{ ann } (RF2 - RF1)R_v\frac{\partial B_c}{\partial R_v}$$

may be combined into one term $(RF2 - RF1)f(B_c)$, giving $$-[RF1 + (RF2 - RF1)]E_2 + RF1B_c + (RF2 - RF1)f(B_c) - H = 0$$

Connections 235 and 239 are respectively connected through resistors 341, 340 to the input circuit of an amplifier 342 of the type shown in Fig. 6, having a feedback resistor 343. The output voltage of amplifier 342 will be proportional to $RF2 - RF1$.

The output circuit of amplifier 342 is connected by connection 344 through resistor 345 to one end of the winding of potentiometer 347. Connection 262 is connected through resistor 346 to the same end of this winding. Thus, the voltage applied is proportional to $+[RF1 + (RF2 - RF1)]$.

The output circuit of amplifier 342 is connected through resistor 348 to the input circuit of an amplifier 349, of the type shown in Fig. 6, having a feedback resistor 350. The output circuit of amplifier 349 is connected by connection 351 through resistor 352 to the other end of the winding of potentiometer 347. Connection 158 is connected through resistor 353 to this end of the winding of potentiometer 347, thus, the voltage applied is proportional to $$-(RF1 + (RF2 - RF1))$$

An intermediate point of the winding of potentiometer 347 is grounded.

The brush of potentiometer 347 is connected through resistor 354 to the input circuit of an amplifier 355, of the type shown in Fig. 6, having a feedback resistor 356.

The brush of potentiometer 320 is connected through resistor 357 to the input circuit of amplifier 355.

The output circuit of amplifier 342 is connected through resistor 358 to the brush of the grounded adjustable resistor 360 and through resistor 359 to ground. The brush of resistor 360 is connected by connection 361 through resistor 362 to the input circuit of amplifier 355.

The brush of potentiometer 326 is connected by connection 327 through resistor 363 to the input circuit of amplifier 355.

The output circuit of amplifier 355 is connected to a phase controlling network 364, of the type shown in Fig. 8. A source of two-phase power 365 has one phase connected directly to one winding of a two-phase motor 366, and the other phase connected through the network 364 to the other winding of motor 366. The brush of potentiometer 346 is driven by the shaft of motor 366, but is insulated therefrom.

The voltages supplied to amplifier 355 are proportional to $$-(RF1 + (RF2 - RF1))E_2 + RF1B_c + (RF2 - RF1)f(B_c) - H$$

and, if the sum of these voltages is not zero, motor 366 moves the brush of potentiometer 347 until the sum is zero. The shaft of motor 366 has thus moved to the final elevation angle $E_2$ for gun 2, and this angle may be indicated, as by dial 367, and sent by known means to the gun crew.

What is claimed is:

1. In a gun data computer, a source of voltage, a first shaft, mechanism connected to said shaft and said source and controlled in accordance with observations of a target to rotate said shaft proportionally to the firing azimuth of a pivot gun to fractionate the voltage from said source proportionally to the horizontal range from the pivot gun to the predicted position of the target, a second shaft, a first potentiometer having a winding connected to said source and brushes rotated by said second shaft to respectively select voltages proportional to the sine and cosine of the angle of rotation of said brushes, fractionating means connected to said brushes and adjusted to select voltages together proportional to the lateral displacement of a second gun from said pivot gun, a second potentiometer having a winding connected to said mechanism and energized by said fractionated voltage, a third shaft driving a brush contacting the winding of said second potentiometer, a motor driving said third shaft, a differential gear connecting all said shafts, and an amplifier having an input circuit connected to said fractionating means and the brush of said second potentiometer and an output circuit connected to said motor, driving said motor to make the sum of the voltages supplied to said amplifier equal to zero, whereby said third shaft is rotated to the difference of the firing azimuths of said guns, and said second shaft is rotated to the firing azimuth of the second gun.

2. In a gun data computer, a source of voltage, mechanism connected to said source and controlled in accordance with observations of a target to fractionate the voltage from said source proportionally to the range from a gun to the predicted position of said target, a shaft, a motor driving said shaft, a first network connected to said source including a first resistor adjusted by said shaft, and having a variation in resistance proportional to the function of the rotation of said shaft equivalent to the tangent of the angle of arrival of the shell, and a second resistor adjusted to fractionate the voltage from said source proportionally to the difference in elevation between said gun and said target, a second network connected to said source and adjusted by said shaft, said second network having a variation in resistance so proportioned as to fractionate the voltage from said source proportionally to the virtual range to said target, a plurality of networks connected to said source and adjusted by said shaft, said plurality of networks being so proportioned as to fractionate the voltage from said source proportionally to the differential ballistic range corrections for said gun, and an amplifier having an input circuit connected to said mechanism and said networks to oppose the voltage from said mechanism by the voltages from said networks and an output circuit connected to said motor driving said motor to make the sum of the voltages supplied to the input circuit zero whereby said shaft is rotated to the firing elevation for the gun.

3. The combination in claim 2 with other mechanism controlled in accordance with the observations of the target and connected to said source to fractionate the voltage from said source proportionally to the difference in the range from said gun to the target and the range from a second gun to the target, a second motor, a third network connected to said source and adjusted by said second motor, said third network being so proportioned as to fractionate the voltage from said source proportionally to the virtual range of said second gun, and a second amplifier having an input circuit connected to said mechanism, said other mechanism, said first and third networks and said plurality of networks and an output circuit connected to said second motor driving said motor to make the sum of the voltages supplied to the input circuit zero, whereby said motor is rotated proportionally to the firing elevation of said second gun.

4. In a computer for directing the fire of a pivot gun and a second gun to a target, a first shaft, mechanism controlled by observations of said target to rotate said first shaft to the azimuth of said pivot gun, a second shaft, a third shaft, a differential gear connecting all said shafts, a grounded source of voltage, a first potentiometer having a winding connected across said source and a first and a second brush rotated by said third shaft, to select a first and a second voltage respectively proportional to the positive cosine and the negative sine of the angle of rotation of said brushes, second and third potentiometers having windings respectively connected to said first and second brushes, and third and fourth brushes respectively manually adjusted to select third and fourth voltages proportional to the rectangular coordinates of said second gun with respect to said first gun, a source of a fifth voltage controlled by said first shaft to be proportional to the distance from said pivot gun to said target, a fourth potentiometer having a winding connected to the source of said fifth voltage and a fifth brush rotated by said second shaft, a thermionic amplifier having an input circuit connected to said third, fourth and fifth brushes and an output circuit, and a motor connected to the output circuit of said amplifier and rotating said second shaft.

5. In a computer for directing shells from a pivot gun and a second gun to a target, mechanism controlled by observations of said target, a source of a first voltage controlled by said mechanism to vary proportionally with the distance from said pivot gun to said target, sources of second and third voltages controlled by said mechanism to respectively vary proportionally to the negative sine and negative cosine of the azimuth of said second gun, means connected to the sources of said second and third voltages to respectively fractionate said voltages proportionally to the rectangular coordinates of said second gun with respect to said first gun, a thermionic amplifier having an input circuit connected to the source of said first voltage and said fractionating means and an output circuit, a motor connected to said output circuit, a source of a fourth voltage proportional to the ballistic range effects on said shells connected to said input circuit, a source of a fifth voltage proportional to the difference in elevation between said second gun and said target connected to said input circuit, a source of a sixth voltage, and a resistor having a winding connected to the source of said sixth voltage and a brush connected to the input circuit of said amplifier and rotated by said motor proportionally to the elevation angle of said second gun.

6. In a gun data computer, a source of voltage, means connected to said source and controlled in accordance with observations of a target to produce a voltage proportional to the slant range from a gun to the predicted position of the target, a shaft, a motor driving said shaft, a first network including a resistor connected to said source and adjusted by said shaft, said resistor being proportioned to produce a variation in resistance causing said network to produce a voltage proportional to the horizontal virtual range of said gun corresponding to said slant range, a plurality of networks connected to said source and adjusted by said shaft, said networks being proportioned to produce voltages together proportional to the range components of the differential ballistic corrections for said gun, and an amplifier having an input circuit connected to said means and all said networks and an output circuit connected to said motor driving said motor to make the sum of the voltages supplied to said input circuit zero, whereby said shaft is rotated to the ballistic elevation of said gun.

7. The combination in claim 6 with a first potentiometer having a winding connected to said means and a first brush rotated by said shaft, a second motor, a second potentiometer having a winding connected to said means and a second brush rotated by said second motor, a third potentiometer having a wnding connected to said source and a third brush adjusted to select a voltage proportional to the height of site of said gun, and an amplifier having an input circuit connected to all said brushes and an output circuit connected to said second motor, whereby said second motor is rotated to the quadrant elevation for said gun 8. In a computer for directing shells from a pivot gun and a second gun to a target, a source of voltage, means connected to said source and controlled by observations of said target to produce a first voltage varying proportionally to the distance from said pivot gun to said target and to produce a second voltage varying proportionally to the difference between the distances from said guns to said target, a mechanism connected to said means and controlled by said first voltage to rotate proportionally to the ballistic elevation angle required by said guns to fire a shell to the projection of said target in the horizontal plane of said guns, a first potentiometer having a winding connected to the source of said first voltage and a first brush rotated by said mechanism, a first motor, a second potentiometer having a winding connected to the source of said first voltage and a second brush rotated by said motor, a network connected to said source and adjusted to select a voltage proportional to the difference in elevation between said guns and said target, an amplifier having an input circuit connected to said first and second brushes and said network and an output circuit connected to said motor, a third potentiometer having a winding connected to the source of said second voltage and a third brush rotated by said mechanism, a fourth potentiometer having a winding connected to said source and a fourth brush rotated by said first motor, a second motor, a fifth potentiometer having a winding connected to said source and a fifth brush rotated by said second motor, and a second amplifier having an input circuit connected to said third, fourth, and fifth brushes and an output circuit connected to said second motor.

9. In a gun data computer, a source of voltage, means connected to said source and controlled in accordance with observations of a target to produce a voltage proportional to the slant range from a gun to the predicted position of the target, a motor, a first network connected to said source and adjusted by said motor, said network including a first resistor having a winding connected to one pole of said source and a brush connected to the other pole of said source and adjusted to the height of site, and a second resistor having a winding connected to the winding of said first resistor and a second brush adjusted by said motor, said resistors being so proportioned as to produce a voltage proportional to the range component of the complementary angle of site, a second network connected to said source and adjusted by said motor, said second network being so proportioned as to produce a voltage proportional to the virtual range of said gun, a plurality of networks connected to said source and adjusted by said motor, said networks being so proportioned as to produce voltages together proportional to the range components of the differential ballistic corrections for said gun, and an amplifier having an input circuit connected to said means and all said networks and an output circuit connected to said motor whereby said motor rotates to the ballistic elevation angle of said gun.

10. The combination in claim 9 with a first potentiometer having a winding connected to said means and a first brush rotated by said motor, a second potentiometer having a winding connected to said source and a second brush adjusted to select a voltage proportional to the height of site of said gun, a second motor, a third potentiometer having a winding connected to said means and a third brush driven by said second motor and an amplifier having an input circuit connected to said first, second and third brushes and an output circuit connected to said second motor whereby said second motor rotates to the quadrant elevation of said gun.

11. In a computer for directing the shells from a pivot gun and a second gun to a target, a first mechanism controlled by observations of said target, a source of a first voltage of one polarity controlled by said first mechanism to vary proportionally with the slant distance from said pivot gun to said target, a source of a second voltage of the same polarity controlled by said first mechanism to vary proportionally with the difference in the slant distances from said pivot gun and said second gun to said target, sources of a third and a fourth voltage of opposite polarities controlled by said first mechanism to vary proportionally with the slant distance from said second gun to said target, a second mechanism controlled by said first mechanism to rotate proportionally to the ballistic elevation angle for said guns corrected for the complementary angle of site, a first potentiometer having a winding connected to the source of said first voltage and a first brush rotated by said second mechanism, a second potentiometer having a winding connected to the source of said second voltage and a second brush rotated by said second mechanism, a motor, a third potentiometer having a grounded winding connected to the sources of said third and fourth voltages and a third brush rotated by said motor, a source of a fifth voltage of said one polarity adjusted to be proportional to the difference in elevation between said guns and said target, and an amplifier having an input circuit connected to all said brushes and to the source of said fifth voltage and an output circuit connected to said motor, whereby said motor is rotated to the quadrant elevation for said second gun.

12. In a gun data computer, a source of voltage, a first shaft, first means connected to said source and shaft and controlled in accordance with observations of a target to rotate said shaft proportionally to the firing azimuth from a pivot gun to the predicted position of the target and to produce a voltage proportional to the range of the pivot gun, second and third shafts, a differential gear connecting all said shafts, a first potentiometer having a winding connected to said source and first, second, third and fourth brushes rotated by said third shaft to respectively select voltages proportional to the positive and negative sine and positive and negative cosine of the angle of rotation of the brushes, two fractionating means adjusted to select voltages proportional to the rectangular coordinates of a second gun with respect to the pivot gun, two double pole switches having contacts connected to said third, fourth, second and first brushes and blades respectively connected to said fractionating means, a second potentiometer having a winding varying in resistance with a sine function connected to said first means and a fifth brush rotated by said second shaft, a motor driving the second shaft, and an amplifier having an input circuit connected to both said fractionating means and said fifth brush and an output circuit connected to said motor, whereby said third shaft is rotated to the firing azimuth of the second gun.

13. The combination in claim 12 with two other fractionating means adjusted to select voltages proportional to the rectangular coordinates of the second gun, two other double pole switches having contacts connected to the second, first, fourth and third brushes and blades connected to said other fractionating means, and computing elements connected to said other fractionating means.

14. The combination in claim 12 with a third potentiometer having a winding connected to said first and second brushes and sixth and seventh brushes adjusted to select voltages proportional to the positive sine and positive cosine of the bearing of the wind, a fourth potentiometer having a winding connected to said third and fourth brushes and eighth and ninth brushes adjusted to select voltages proportional to the positive cosine and negative sine of the bearing of the wind, summing means connected to said sixth and eighth brushes and to said seventh and ninth brushes, fractionating means connected to said summing means and adjusted to select voltages proportional to the magnitude of the wind, and computing elements connected to said fractionating means.

15. In a gun data computer, a shaft, means controlled in accordance with observations of a target to rotate said shaft proportionally to the firing azimuth of a gun, a source of voltage, a first potentiometer having a winding connected to said source and first, second, third and fourth brushes rotated by said shaft to respectively select voltages proportional to the positive and negative sine and the positive and negative cosine of the firing azimuth, a second potentiometer having a winding connected to said first and second brushes and sixth and seventh brushes adjusted to select voltages proportional to the positive sine and positive cosine of the bearing of the wind, a third potentiometer having a winding connected to said third and fourth brushes and eighth and ninth brushes adjusted to select voltages proportional to the positive cosine and negative sine of the bearing of the wind, summing means connected to said sixth and eighth brushes and to said seventh and ninth brushes, fractionating means connected to said summing means and adjusted to fractionate the outputs of said summing means proportionally to the magnitude of the wind, and computing elements connected to said fractionating means, whereby voltages proportional to the range component and the cross component of the correction for wind are supplied to said computing elements.

EMORY LAKATOS.

REFERENCES CITED

The following references are of record in the file of this patent:

UNITED STATES PATENTS

| Number | Name | Date |
|---|---|---|
| 2,134,901 | Wey | Nov. 1, 1938 |
| 2,164,728 | Wey | July 4, 1939 |

FOREIGN PATENTS

| Number | Country | Date |
|---|---|---|
| 164,765 | Great Britain | June 23, 1921 |